US010358356B1

United States Patent
Awad et al.

(10) Patent No.: US 10,358,356 B1
(45) Date of Patent: Jul. 23, 2019

(54) **SYNTHESIS OF ZINC OXIDE NANOPARTICLES USING *CYMBOPOGON PROXIMUS* EXTRACT**

(71) Applicant: KING SAUD UNIVERSITY, Riyadh (SA)

(72) Inventors: Manal Ahmed Gasmelseed Awad, Riyadh (SA); Awatif Ahmed Hendi, Riyadh (SA); Khalid Mustafa Osman Ortashi, Riyadh (SA); Ali Kanakhir Aldalbahi, Riyadh (SA); Reema Abdullah Alnamlah, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/239,972

(22) Filed: Jan. 4, 2019

(51) Int. Cl.
  *C01G 9/02* (2006.01)
  *B82Y 30/00* (2011.01)
  *B82Y 40/00* (2011.01)

(52) U.S. Cl.
  CPC ............... *C01G 9/02* (2013.01); *B82Y 30/00* (2013.01); *B82Y 40/00* (2013.01); *C01P 2002/72* (2013.01); *C01P 2004/04* (2013.01); *C01P 2004/51* (2013.01); *C01P 2004/62* (2013.01)

(58) Field of Classification Search
  CPC .......... C01G 9/02; B82Y 30/00; B82Y 40/00; C01P 2002/72; C01P 2004/04; C01P 2004/51; C01P 2004/62
  See application file for complete search history.

(56) References Cited

FOREIGN PATENT DOCUMENTS

CN          107556529 A       1/2018

OTHER PUBLICATIONS

Anvekar, Tushar Shamba, Vrajeshwari Rajendra Chari, and Had Kadam. "Green Synthesis of ZnO Nanoparticles, its Characterization and Application." Material Science Research India 14.2 (2017): 153-157.*

Surendra, T.V. et al., "Vegetable Peel Waste for the Prodution of ZnO Nanoparticles and its Toxicological Efficiency, Antifungal, Hemolytic, and Antibacterial Activities", Nanoscale Research Letters (2016) 11:546, pp. 1-10.

Ui Haq, A.N. et al., "Synthesis Approaches of Zinc Oxide nanoparticles: The Dilemma of Ecotoxicity", Hindawi Journal of Nanomaterials, vol. 2017, Apr. 18, 2017, pp. 1-14.

Rao, N.S. et al., "Structural and Optical Investigation of ZnO Nanopowders Synthesized from Zinc Chloride and Zinc Nitrate", American Journal of Materials Science, 2015, 5(3), pp. 66-68.

Awodugba, A.O. et al., "Synthesis and Characterization of ZnO Nanoparticles with Zinc Chloride as Zinc Source", Asian Journal of Natural & Applied Sciences, vol. 2, No. 2, Jun. 2013.

Anvekar et al., "Green Synthesis of ZnO Nanoparticles, its Characterization and Application," Material Science Research India, vol. 14, No. (2) 2017, p. 153-157.

Ajayi et al., "Green synthesis, characterization and biological activities of silver nanoparticles from alkalinized Cymbopogon citratus Stapf," Advances in Natural Sciences: Nanoscience and Nanotechnology, vol. 8, No. 1, Mar. 3, 2017.

* cited by examiner

*Primary Examiner* — Richard M Rump
(74) *Attorney, Agent, or Firm* — Richard C. Litman (57) ABSTRACT

A method of synthesizing zinc oxide nanoparticles includes preparing a liquid extract of *Cymbopogon proximus*, dissolving zinc salt in the liquid extract to provide an extract with zinc salt, adding a base to the extract with zinc salt to form a precipitate including zinc oxide nanoparticles. The method overcomes the drawbacks associated with prior chemical methods of synthesizing nanoparticles, while providing increased yield of the nanoparticles.

12 Claims, 8 Drawing Sheets

SYNTHESIS OF ZINC OXIDE NANOPARTICLES USING *CYMBOPOGON PROXIMUS* EXTRACT

BACKGROUND

1. Field

The disclosure of the present patent application relates to a green or environmentally friendly method for synthesizing zinc oxide nanoparticles, and particularly, to a method of synthesizing zinc oxide nanoparticles using *Cymbopogon proximus* (Maharayb lemongrass).

2. Description of the Related Art

Nanoparticles (NPs) have revolutionized many major industrial areas, with uses ranging from drug delivery to agriculture to the food industry. Chemical synthesis methods for producing suitable NPs have included emulsion solvent extraction, double emulsion evaporation, salting out, emulsion diffusion, and solvent displacement/precipitation. However, many of these methods, especially at the industrial scale of production, can be harmful to the environment.

Among the nanomaterials useful in industry, zinc oxide (ZnO) is particularly valuable. ZnO is an n-type semiconductor that displays a hexagonal crystalline wurtzite-type structure. The value of ZnO is due to its unusual physical properties: high conductance, chemical and thermal stability, wide and direct band gap of 3.37 eV, and high excitation binding energy of 60 MeV. Moreover, ZnO exhibits good radiation resistance, and is harmless to the environment.

Zinc oxide nanostructures have great potential in preparing solar cells. Other areas of industrial applicability include rubber production, acoustic devices, electrical and optical devices, chemical catalysts, pigments, cosmetics, varistors, gas sensors, ceramics, electronics, paints, animal feed, and pharmaceuticals.

SUMMARY

A method of synthesizing zinc oxide nanoparticles includes preparing a liquid extract of *Cymbopogon proximus*, dissolving zinc salt in the liquid extract to provide an extract with zinc salt, adding a base to the extract with zinc salt to form a precipitate including zinc oxide nanoparticles. The method overcomes the drawbacks associated with prior chemical methods of synthesizing nanoparticles, while providing increased yield of the nanoparticles.

These and other features of the present teachings will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of synthesizing zinc oxide nanoparticles includes preparing a liquid extract of *Cymbopogon proximus* (referred to as Maharayb in Yemen), dissolving zinc salt in the liquid extract to provide an extract with zinc salt, adding a base to the extract with zinc salt to form a precipitate including zinc oxide nanoparticles. The zinc salt can be zinc chloride or zinc nitrate, for example. The base, e.g., NaOH, can be added dropwise to the extract, with magnetic stirring.

The liquid extract can be prepared by collecting, drying and grinding *Cymbopogon proximus*. A finer grind can provide a more concentrated extract. Boiled water can then be added to the ground material. The ground material can be soaked in the water for a length of time, e.g., twelve hours or more, to produce the liquid extract.

The method for synthesizing zinc oxide nanoparticles described herein can produce zinc oxide nanoparticles that exhibit very good photochemical reactivity. The zinc oxide nanoparticles are effective photocatalysts and efficiently degrade toxic water pollutants (e.g., pollutants released from textile and dyeing industries) in the presence of sunlight. As such, these nanoparticles can be used to efficiently clean drinking water. This method of producing zinc oxide nanoparticles could prove valuable in solving the shortage of clean drinking water around the world.

The present teachings are illustrated by the following examples.

Example 1

Preparation of *Cymbopogon proximus* Extract

About 200 mg of *Cymbopogon proximus* was washed with tap water several times before being washed with distilled water. The *Cymbopogon proximus* was then air dried under a hood for about one day, and then ground to a fine powder.

Next, 100 ml of boiled, distilled water was added to 200 mg of the powder, mixed well together, and left to soak overnight at room temperature to produce the liquid extract. The liquid extract was then filtered. For nanosheets, zinc chloride was dissolved into the extract, as described in Example 2. For nanotubes, zinc nitrate was dissolved into the extract, as described in Example 3.

Example 2

Preparation of Zinc Oxide Nanosheets 0.4 M Zinc Chloride ($ZnCl_2$) was dissolved in the *Cymbopogon proximus* extract, with stirring at 80° C. 0.8 M aqueous sodium hydroxide (NaOH) was added dropwise under magnetic stirring, to produce a paste. About 10 ml of the NaOH was added over about 10 minutes. After the addition was completed, stirring continued for an additional 60 minutes. The resulting precipitate was centrifuged at 15000 rpm for 5 minutes, and liquid was discharged from the precipitate. The pellet was washed repeatedly with distilled water, and then ethanol, to remove impurities. The resulting paste was then dried at 200° C. for 5 hours to provide a beige powder including ZnO nanoparticles.

Example 3

Preparation of Zinc Oxide Nanotubes 0.5M zinc nitrate hexahydrate ($Zn(NO_3)_2 \cdot 6H_2O$) was dissolved in the *Cymbopogon proximus* extract, with stirring at 90° C. 0.5M aqueous sodium hydroxide (NaOH) was added dropwise under magnetic stirring, to produce a paste. About 10 ml of the NaOH was added over about 10 minutes. After the addition was completed, stirring continued for an additional 60 minutes. The resulting precipitate was then centrifuged at 15000 rpm for 5 minutes, and liquid was discharged from the precipitate. The precipitated pellet was washed repeatedly with distilled water, and then ethanol, to remove impurities. The resulting paste was then dried at 200° C. for 5 hours to provide a beige powder including the ZnO nanoparticles.

Example 4

Characterization of the Zinc Oxide Nanoparticles

Figure 1:
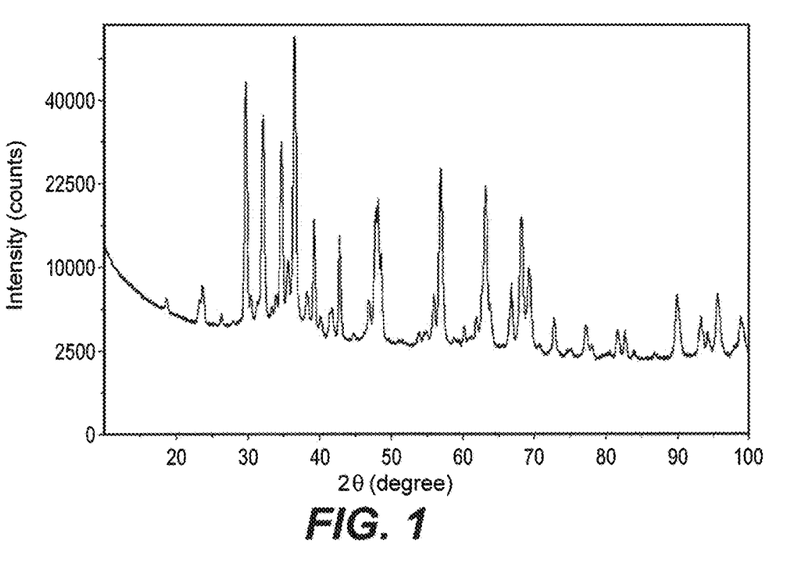
FIG. 1 is an x-ray diffraction (XRD) pattern for the ZnO nanosheets synthesized using zinc chloride and *Cymbopogon proximus* extract.
Figure 2:
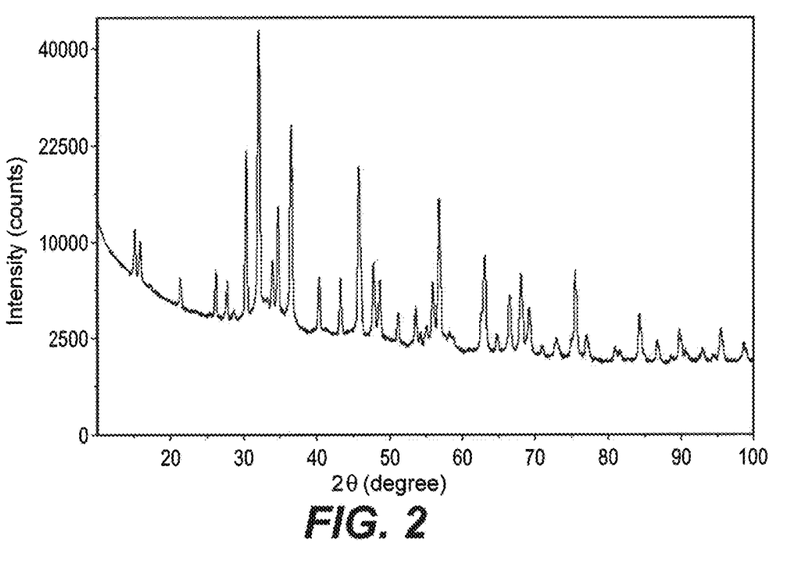
FIG. 2 is an x-ray diffraction (XRD) pattern for the ZnO nanosheets synthesized using zinc nitrate hexahydrate and *Cymbopogon proximus* extract.
Figure 3:
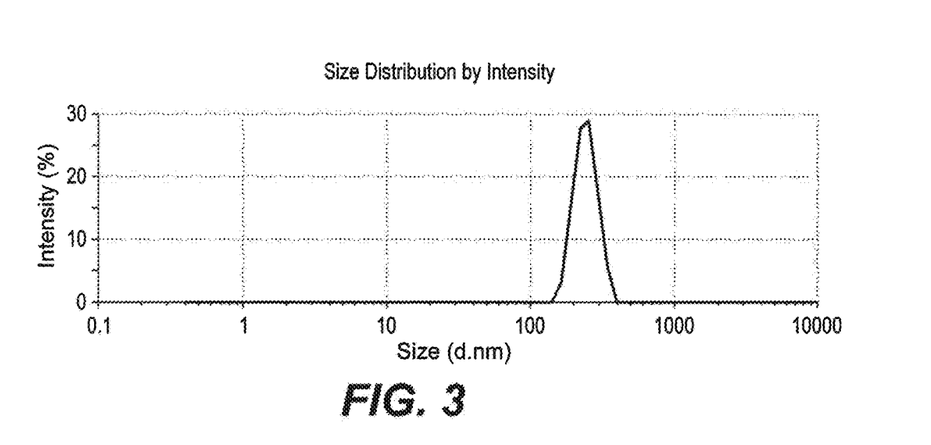
FIG. 3 is a zeta sizer particle measure plot, measuring the average size of the ZnO nanosheets synthesized using zinc chloride and *Cymbopogon proximus* extract.
Figure 4:
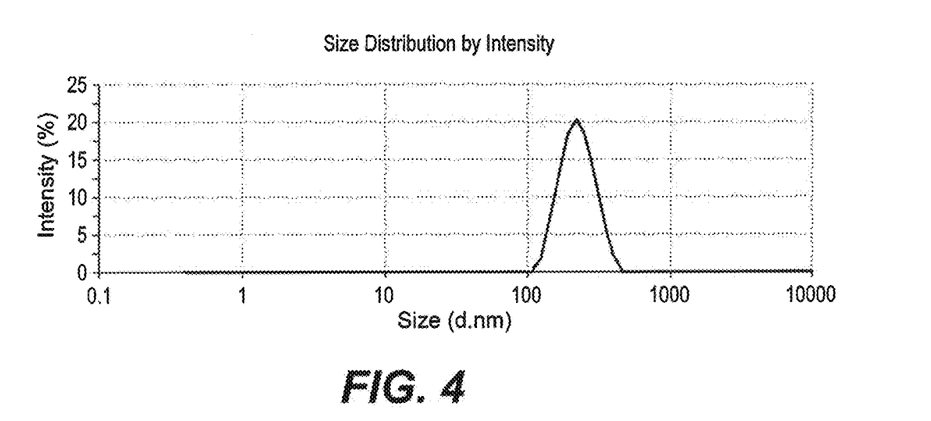
FIG. 4 is a zeta sizer particle measure plot, measuring the average size of the ZnO nanosheets synthesized using zinc nitrate hexahydrate and *Cymbopogon proximus* extract.

The ZnO nanoparticles obtained in Examples 2 and 3 above were characterized using a variety of instrumentation. X-Ray Diffraction patterns of the zinc oxide nanoparticles prepared using zinc chloride and zinc nitrate hexahydrate are presented in FIGS. 1 and 2, respectively. The size distribution of the zinc oxide nanoparticles was measured using a Zen 3600 Zetasizer Nano system (Malvern Instruments, UK). The average size of the nanoparticles synthesized using *Cymbopogon proximus* extract and zinc chloride is reported as 433.4 nm (FIG. 3). The average size of the nanoparticles synthesized using *Cymbopogon proximus* extract and zinc nitrate hexahydrate is reported as 237.9 nm (FIG. 4).

Figure 5A:
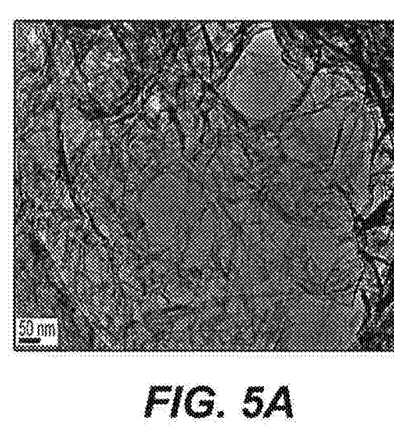
FIGS. 5A to 5D are transmission electron microscopy (TEM) images of the ZnO nanosheets synthesized using zinc chloride and *Cymbopogon proximus* extract, at scale bars of 50 µm, 20 µm, 200 nm, and 5 nm, respectively.
Figure 5B:
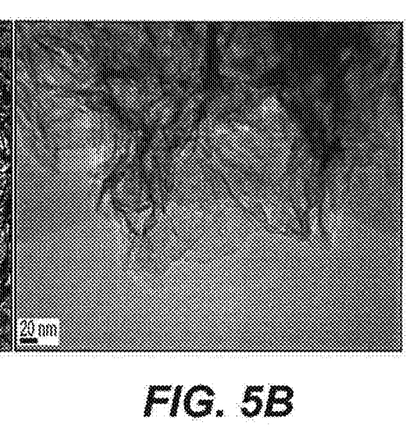
Figure 5C:
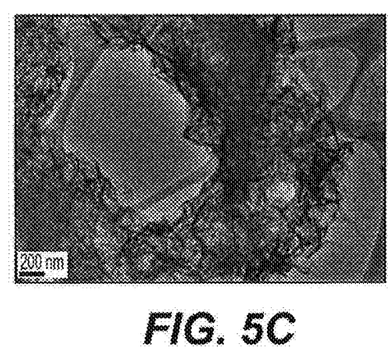
Figure 5D:
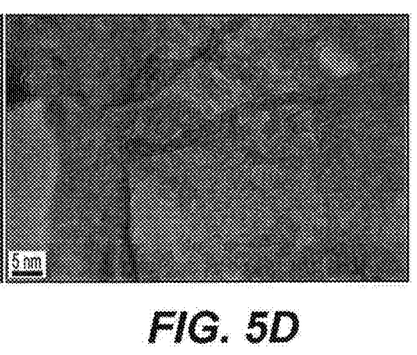
Figure 6A:
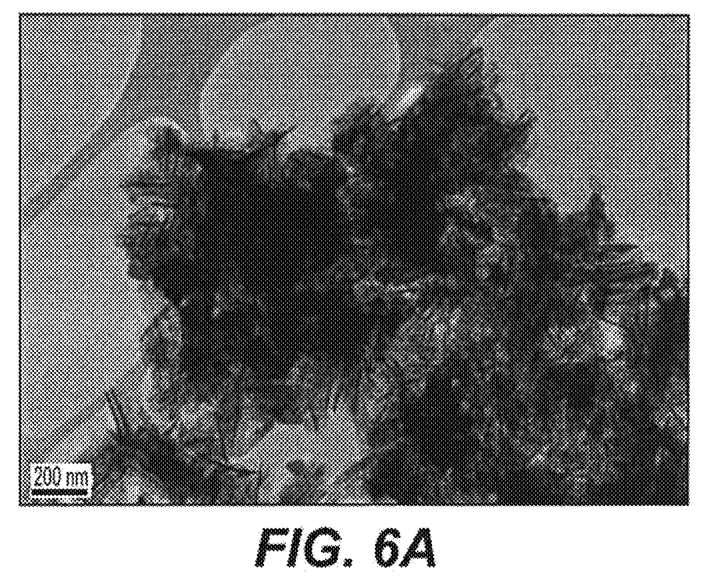
FIGS. 6A and 6B are transmission electron microscopy (TEM) images of the ZnO nanosheets synthesized using zinc nitrate hexahydrate and *Cymbopogon proximus* extract, at scale bars of 200 nm and 2 nm, respectively.
Figure 6B:
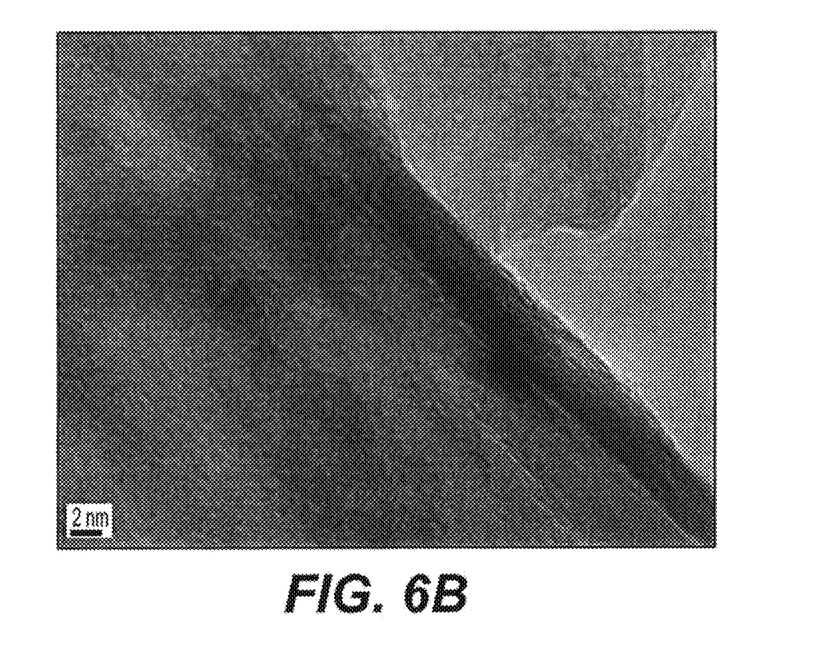

The morphology of the zinc oxide nanoparticles was characterized using transmission electron microscopy (TEM) (JEM-1400, JEOL, Japan). FIGS. 5A-5B show TEM images for nanosheets prepared using zinc chloride and the *Cymbopogon proximus* extract. FIGS. 6A-6B show TEM images for nanotubes prepared using zinc nitrate hexahydrate and the *Cymbopogon proximus* extract.

Figure 7:
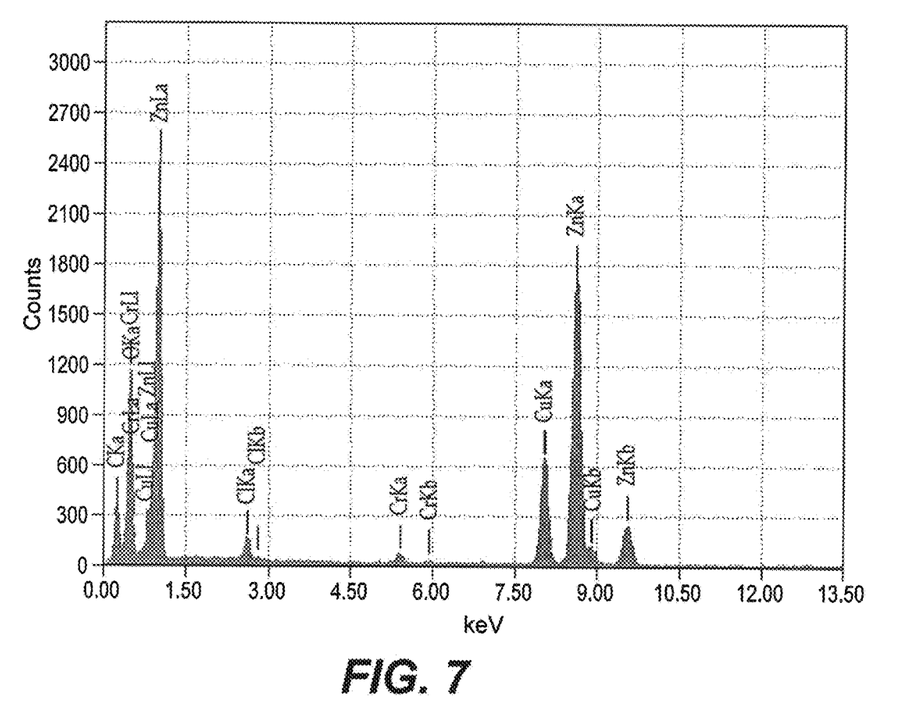
FIG. 7 is an energy dispersive x-ray spectroscopy (EDS) plot of the ZnO nanosheets synthesized using zinc chloride and (*Cymbopogon proximus* extract.
Figure 8:
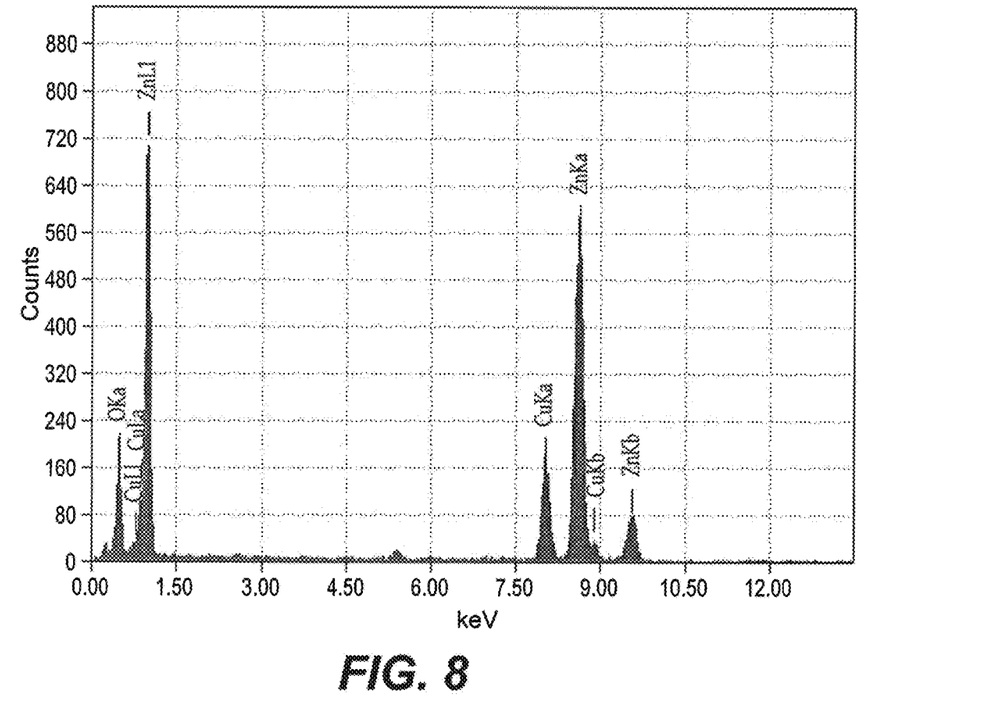
FIG. 8 is an energy dispersive x-ray spectroscopy (EDS) plot of the ZnO nanosheets synthesized using zinc nitrate hexahydrate and *Cymbopogon proximus* extract.

Energy Dispersive Spectrometer (EDS) analysis was conducted (EDS, JSM-7610F, JEOL, USA). The results confirmed the presence of zinc and oxygen as expected in the nanoparticles. FIG. 7 shows the EDS analysis for the nanoparticles prepared using zinc chloride. FIG. 8 shows the EDS analysis for the nanoparticles prepared using zinc nitrate hexahydrate.

Example 5

Photocatalytic Activity

Photocatalytic activity of the nanoparticles was evaluated under UV irradiation and sunlight irradiation, using Rhodamine B dye. 20 ml of dye solution was placed in a laboratory-scale cuvette, and the nanoparticle sample was dispensed inside the cuvette. The mixture was then exposed to either a UV lamp, or to direct sunlight irradiation.

Optical absorption spectra were determined for a range of light exposure durations, using a UV/Vis spectrophotometer. The rate of degradation was monitored by recording the reduction in absorption intensity of the dye at the maximum wavelength.

The degradation efficiency (DE %) was calculated using the equation:

$$DE\% = (A_0 - A)/A_0 \times 100$$

where $A_0$ is the initial absorption intensity, and A is the absorption intensity after the photo-degradation takes place completely. The zinc oxide nanoparticles produced by both of the methods discussed above (Examples 2 and 3) demonstrated good photocatalytic activity under both UV and sunlight exposure.

Figure 9:
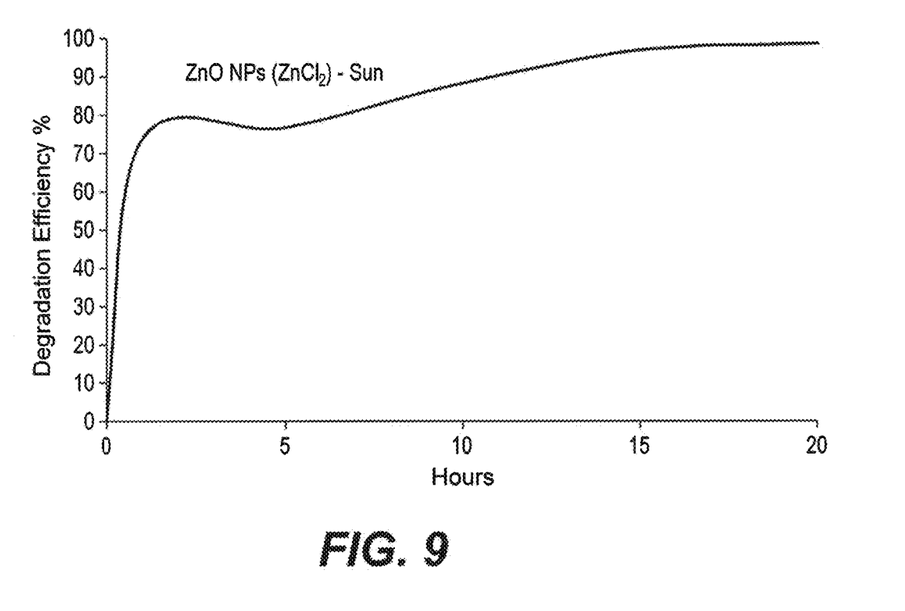
FIG. 9 is a plot of the degradation efficiency for the ZnO nanoparticles synthesized by the process in Example 2, under sun irradiation measured over a period of 20 hours.
Figure 10:
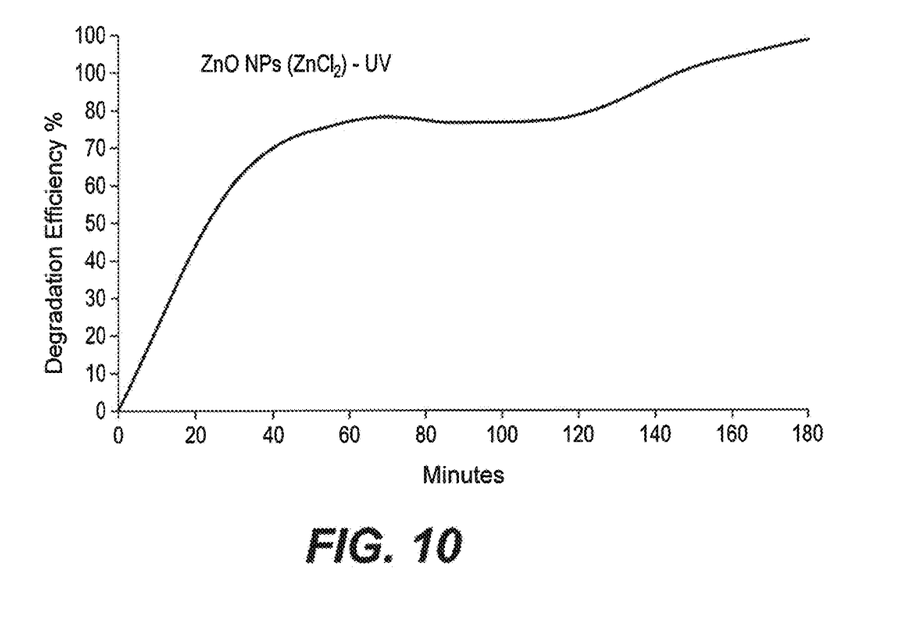
FIG. 10 is a plot of the degradation efficiency for the ZnO nanoparticles synthesized by the process in Example 2, under ultraviolet (UV) light irradiation measured over a period of 160 minutes.
Figure 11:
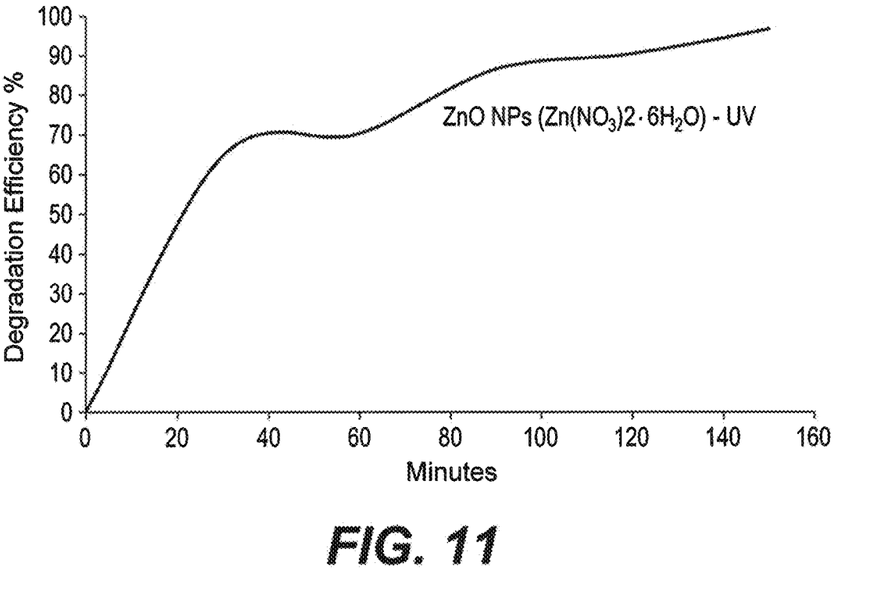
FIG. 11 is a plot of the degradation efficiency for the ZnO nanoparticles synthesized by the process in Example 3, under ultraviolet (UV) light irradiation measured over a period of 160 minutes.
Figure 12:
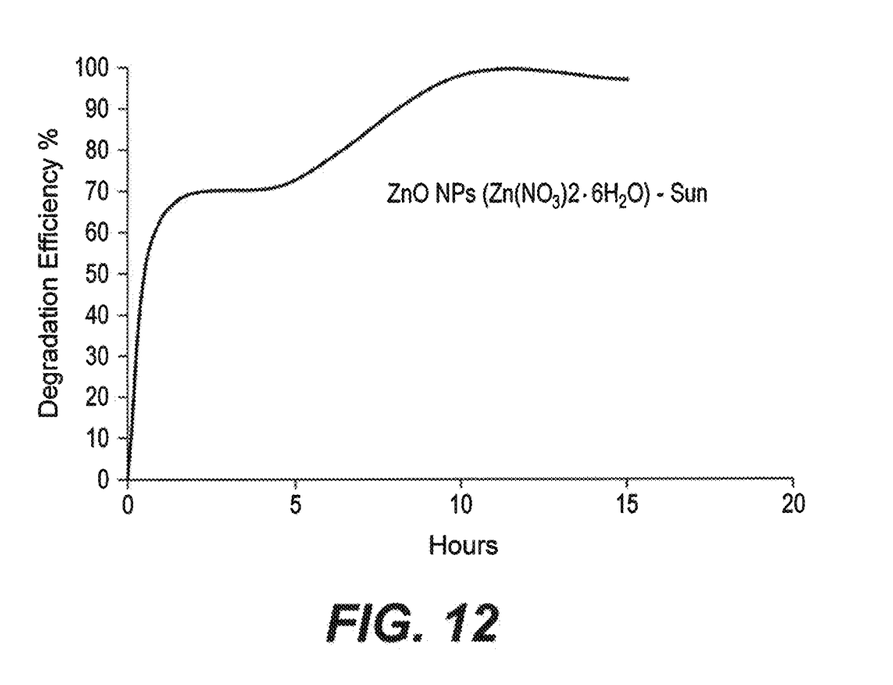
FIG. 12 is a plot of the degradation efficiency for the ZnO nanoparticles synthesized by the process in Example 3, under sun irradiation measured over a period of 20 hours.

Dye removal was about 100% after about 20 hours of sun irradiation (FIG. 9) and after about 150-180 minutes of UV irradiation (FIG. 10), for the zinc oxide nanoparticles produced using zinc chloride (Example 2). For the zinc oxide nanoparticles prepared using zinc nitrate hexahydrate (Example 3), catalysis was substantially complete after about 11-12 hours of sunlight irradiation (FIG. 12) and after about 150-180 minutes of UV irradiation (FIG. 11). These results can be attributed to an increase in the number of active sites, and thus the number of photons absorbed by the catalyst. This excellent degradation efficiency for the zinc oxide nanoparticles opens a wide range of applications for these nanoparticles, such as in water treatment.

It is to be understood that the synthesis method is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method of synthesizing zinc oxide nanoparticles, comprising the steps of:
   a) grinding an amount of *Cymbopogon proximus* to produce a ground material;
   b) adding boiled water to the ground material to produce a liquid extract;
   c) filtering the extract to produce a filtered liquid extract;
   d) dissolving a zinc salt in the filtered liquid extract to produce a filtered liquid extract with zinc;

e) adding a base to the filtered liquid extract with zinc to form a paste;
f) removing liquid from the paste to provide a pellet;
g) drying the pellet, to produce a powder containing zinc oxide nanoparticles.

2. The method of claim 1, further comprising stirring the zinc salt in the filtered liquid extract at about 80° C.

3. The method of claim 1, wherein the base is a strong base.

4. The method of claim 3, wherein the strong base is sodium hydroxide.

5. The method of claim 1, wherein the zinc salt is zinc oxide.

6. The method of claim 1, wherein the zinc salt is zinc nitrate hexahydrate.

7. The method of claim 1, wherein the base is added dropwise with constant stirring.

8. The method of claim 1, wherein the pellet is dried at about 200° C. for about 5 hours.

9. A method of synthesizing zinc oxide nanoparticles, comprising the steps of:

a) grinding an amount of *Cymbopogon proximus* to produce a ground material;
b) adding boiled water to the ground material to produce a liquid extract;
c) filtering the extract to produce a filtered liquid extract;
d) dissolving a zinc salt in the filtered liquid extract to produce a filtered liquid extract with zinc;
e) adding sodium hydroxide to the filtered liquid extract with zinc to form a paste;
f) centrifuging liquid from the paste to provide a pellet;
g) drying the pellet, to produce a powder containing zinc oxide nanoparticles.

10. The method of claim 9, further comprising stirring the zinc salt in the filtered liquid extract at about 80° C.

11. The method of claim 9, wherein the zinc salt is zinc oxide.

12. The method of claim 9, wherein the zinc salt is zinc nitrate hexahydrate.

\* \* \* \* \*